United States Patent
Strasser

(10) Patent No.: US 6,320,373 B1
(45) Date of Patent: Nov. 20, 2001

(54) CIRCUIT ARRANGEMENT AND METHOD FOR SELECTIVELY OPERATING HALL ELEMENTS AND MEMORIES OF A POSITION SENSOR

(75) Inventor: Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/036,168

(22) Filed: Mar. 6, 1998

(30) Foreign Application Priority Data

Mar. 6, 1997 (DE) .............................. 197 09 087

(51) Int. Cl.[7] .................................................. G01B 7/30
(52) U.S. Cl. .................................. 324/207.2; 324/207.25
(58) Field of Search ........................... 324/207.2, 207.12, 324/207.21, 207.22, 207.24, 207.25, 252, 260; 338/32 H

(56) References Cited

U.S. PATENT DOCUMENTS

| | | | |
|---|---|---|---|
| 4,728,950 | 3/1988 | Hendrickson et al. | 340/870.31 |
| 4,780,703 | 10/1988 | Ishida et al. | |
| 4,796,005 | 1/1989 | Ishida et al. | |
| 5,258,735 | * 11/1993 | Allwine, Jr. | 335/306 |
| 5,313,159 | * 5/1994 | Allwine, Jr. | 324/207.2 |
| 5,528,218 | * 6/1996 | Rigsby | 340/475 |
| 5,530,345 | * 6/1996 | Murari et al. | 324/207.2 |
| 5,969,495 | * 10/1999 | Cherry, Jr. et al. | 318/685 |
| 6,088,448 | * 7/2000 | Poirel | 379/438 |

FOREIGN PATENT DOCUMENTS

| | | |
|---|---|---|
| 44 42 371 A1 | 5/1996 | (DE) . |
| 0 158 781 | 10/1985 | (EP) . |
| 0 331 828 | 9/1989 | (EP) . |
| 0 620 647 | 10/1994 | (EP) . |

* cited by examiner

Primary Examiner—Jay Patidar
(74) Attorney, Agent, or Firm—Brinks Hofer Gilson & Lione

(57) ABSTRACT

The invention relates to a position sensor which scans a magnetic graduation having a code structure with several Hall elements. The Hall elements are not simultaneously activated, interrogated and deactivated but rather are sequentially activated, interrogated and deactivated in order to reduce the consumption of power by the position sensor. The position values determined by the Hall elements are stored in intermediate memories. Alternatively, if the rotation of the graduation exceeds a threshold value then an intermediate memory or memories is bypassed and the output signal is directly output. The position sensor according to the present invention can be employed with longitudinal and angular measuring systems.

28 Claims, 3 Drawing Sheets

CIRCUIT ARRANGEMENT AND METHOD FOR SELECTIVELY OPERATING HALL ELEMENTS AND MEMORIES OF A POSITION SENSOR

FIELD OF THE INVENTION

The present invention relates to a position sensor and a method for its operation, and more particularly, to a position sensor having several Hall elements which are selectively activated and deactivated.

BACKGROUND OF THE INVENTION

Position sensors in the form of angle encoders of the type having a magnetic graduation with a code structure have been known in the prior art. Applicant's German Patent Publication No. DE 44 42 371 A1 discloses distinguishing such graduations by a multi-track alternating magnetization of a dynamically balanced body which rotates proportionally in relation to the rotary movement supplied to the angle encoder. During rotation, this alternating magnetization is detected by static Hall elements which scan every track of the graduation and output an absolute position signal.

European Patent Publication No. EP 0 331 828 A1 discloses a multi-turn sensor which is basically composed of two measuring systems, an incremental optical measuring system and a magnetic detector. The incremental optical measuring system determines the exact position of an optical graduation during one revolution of the graduation and the magnetic detector determines the number of revolutions of the optical graduation. By using such a multi-turn sensor it is possible for a control unit to determine the absolute position of the optical graduation even after several revolutions of the optical graduation. When the multi-turn sensor is connected to a supply voltage, the stored number of revolutions and the stored incremental value are output so the absolute position is output immediately after power is supplied. To reduce the amount of electricity used by the multi-turn sensor, magneto-resistive elements having several hundred KΩ of internal resistance are used and additional resistors are connected in series. In addition, digital component groups produced by CMOS technology are used.

A disadvantage of such a system is that the electrical power requirements of CMOS components increase with frequency so that at high processing speeds the requirement for electrical power is large. In addition, special magneto-resistive elements having a high internal resistance are required which makes further elaborate processing of their output signals necessary which introduces an increased sensitivity to noise in the system.

U.S. Pat. Nos. 4,780,703 and 4,796,005 disclose an incremental angle encoder where the position, or respectively the angle of rotation, is determined by an optical measuring system. The optical measuring system has a light source, a static graduation and a rotating graduation, as well as light-sensitive component groups with their associated electronic evaluation devices. To save energy, the light source and the electronic evaluation devices are connected with a supply voltage only long enough as is required to determine the position within the smallest graduation period. These component groups are otherwise disconnected from the energy supply.

A disadvantage with such a system is that because of the considerably higher current strengths required by the entire circuit arrangement while the light source and the electronic evaluation device are coupled to the supply voltage for only a short-time, interference often occurs.

SUMMARY OF THE INVENTION

It is therefore an object of the present invention to design a position sensor with a magnetic measuring system, and to disclose a method for its operation that considerably reduces the requirement for electrical power while minimizing the possibility of interference.

The method for operating a position sensor according to the present invention has an advantage that the Hall elements provided for the detection of a position are not all simultaneously switched on, interrogated and switched off, but instead are switched on, interrogated and switched off in a defined sequence. Since the maximum current requirement of the entire circuit arrangement is essentially determined by the current requirements of the Hall elements, it is possible to reduce the maximum current requirement considerably by the sequential activation and deactivation of the individual Hall elements.

Furthermore, only a small number of Hall elements are simultaneously switched on thus any interference that may be caused by the switching process is practically negligible. A time-delayed storage of the output signal of each Hall element is of further advantage because of which interference occurring in a stabilization phase of the Hall elements are suppressed. The position sensor according to the present invention has an advantage that it is possible to activate and deactivate individual Hall elements by individual control lines. In addition, each memory component group can be separately controlled by the control unit.

The position sensor and method for its operation according to the present invention will now be described by the drawings and explained in greater detail.

DETAILED DESCRIPTION OF THE PRESENTLY PREFERRED EMBODIMENTS

Figure 1:
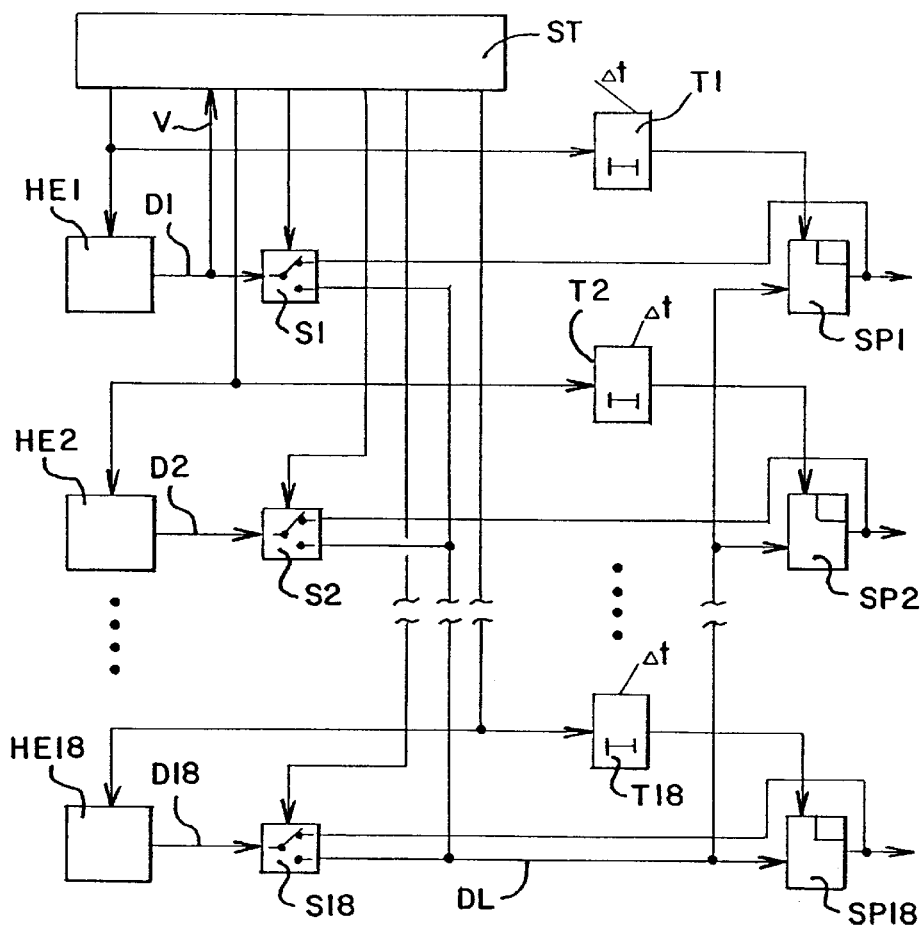
FIG. 1 is a block diagram of a position sensor according to a preferred embodiment of the present invention.

FIG. 1 is a block diagram of a position sensor according to a preferred embodiment of the present invention. The position sensor includes a plurality of Hall elements HE1, HE2, . . . , HE18; a plurality of switches S1, S2, . . . , S18; a plurality of delay units T1, T2, . . . , T18; a plurality of memory component groups SP1, SP2, . . . , SP18 and a control unit ST.

Each Hall element HE1, HE2, . . . , HE18 outputs a signal D1, D2, . . . , D18 respectively to its respective switch S1, S2, . . . , S18. Each Hall element, switch and delay unit is coupled to an output of the control unit ST as illustrated.

The position sensor and method according to the present invention will be described with reference to a multi-turn angle encoder which directly outputs a parallel code and has, in addition to a magnetic graduation with a code structure, at least one optical graduation OG which can have a code structure as well as an incremental structure. The present invention, however, is not limited to a multi-turn angle encoder but can also be used in connection with position sensors for longitudinal measuring systems, with single-turn angle encoders or with measuring systems which output an incremental value.

In a first step the rotary movement to be measured is transmitted to an optical graduation OG (not shown) of the angle encoder which has several graduation tracks designed to output a code when scanned by a scanning unit SO. The lowest-weighted bits of an output signal of the angle encoder are generated by scanning the optical graduation OG. For example, in an optical graduation with a code structure the 360° of the full circle is split up into small parts usually of equal length. For example, if the full circle is split into 64 parts of equal length, each part covers 360°:64=5.625°. One is thus able to detect rotary movement with an accuracy of 5.625°. Since the optimal graduation OG is divided into 64 parts the resolution of the graduation OG is 6 bits, i.e. $64=2^6$. Thus, a single-turn angle encoder with a resolution of six bits, for example, is realized by the optical graduation OG.

Figure 2:
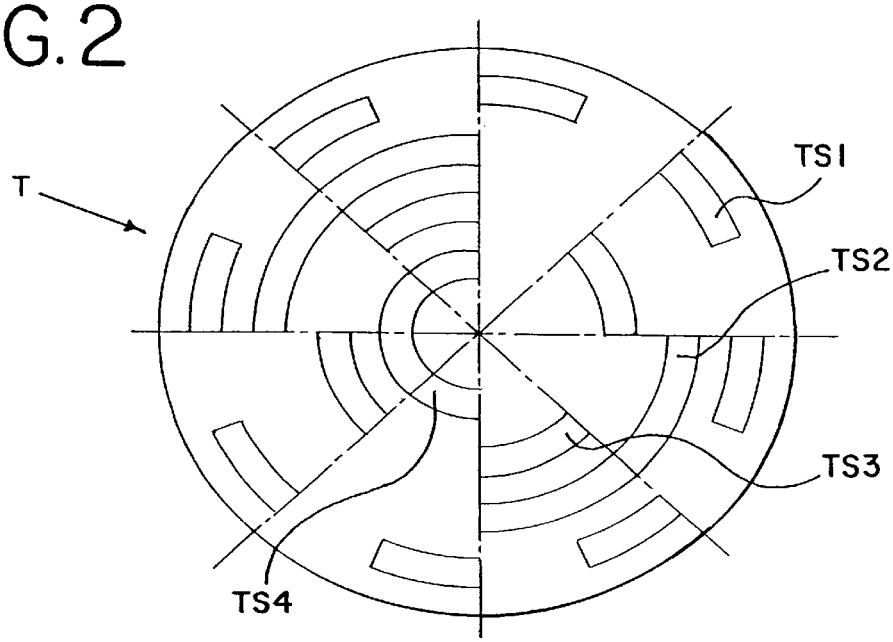
FIG. 2 is schematic of a magnetic graduation with a code structure according to a preferred embodiment of the present invention.

To enlarge the range from a single-turn to a multi-turn angle encoder, a gear G reduction (not shown) is used to reduce the rotation of the optical graduation OG so that one rotation of the optical graduation results in a change of the least significant bit of an additional graduation, i.e., the magnetic graduation. Through the gear G reduction the rotary movement of the optical graduation OG is reduced by a factor of $1:2^6$ and is supplied to a magnetic graduation T which is represented in FIG. 2. The reduction ratio corresponds to the resolution of the optical graduation OG so that the highest-weighted bit of the optical graduation has one-half the weight of the lowest-weighted bit of the magnetic graduation T. As a rule, the magnetic graduation T is basically designed to be identical to the optical graduation OG in accordance with a digital code, for example, the Gray code.

The magnetic graduation T has a plurality of graduation tracks, for example, TS1, TS2, TS3 and TS4. Hall elements HE1, HE2, . . . , HE18 are statically arranged immediately above individual graduation tracks and detect the magnetization which the graduation track lying underneath it has at the moment. One Hall element is assigned to one graduation track. Thus, the magnetic graduation in this preferred embodiment would have 18 graduation tracks. Thus, while only four graduation tracks are shown in FIG. 2, the present invention is not so limited. The output signal of the Hall elements has two states corresponding to the magnetization of the graduation track. Since the graduation periods of the graduation tracks TS1 to TS4 always differ from each other by a factor of 2, the weight of the output signals of the Hall elements also differs by a factor of 2 corresponding to the graduation period. The Hall elements have been arranged above the individual graduation tracks TS1 to TS4 in such a way that the output signal of the Hall element HE1 has the lowest weight since it is arranged above the graduation track TS1 with the shortest graduation period. Numbering of the Hall elements has been selected such that the weight of the output signal of the Hall element is expressed by its number, so that the output signal of the greatest weight is output by the Hall element HE18.

As represented in FIG. 1, the output signal D1–D18 of each Hall element HE1 to HE18 is respectively supplied to its respective switch S1 to S18 where the output signal is either transmitted to an input of memory component groups SP1 to SP18 on data line DL, or is made directly available as output signal of the angle encoder. The number of switches to be provided is a function of the maximum velocity V of the position change, i.e. the maximum r.p.m. of the angle encoder and the processing speed of the component groups used.

Each Hall element HE1 to HE18 is coupled by a control line with a control unit ST and control unit ST can switch each individual Hall element HE1 to HE18 on and off, i.e., activate and deactivate each Hall element. It is obvious that a deactivated Hall element does not draw any current and thus the current requirements of the position sensor can be reduced by the deactivation of Hall elements. The switches S1 to S18 are also coupled to the control unit ST by control lines. The control unit ST controls the position of each switch. In addition, the memory component groups SP1 to SP18 are coupled to the control unit ST by a control line either directly (not shown) or through a delay unit T1, T2, . . . T18.

The mode of operation of the angle encoder according to the present invention will now be explained. After the control unit ST of the angle encoder has been coupled to a supply voltage (not shown), the control unit ST determines the absolute position of the angle encoder by interrogating each Hall element HE1 to HE18 in a defined, programmed sequence.

Figure 3A:
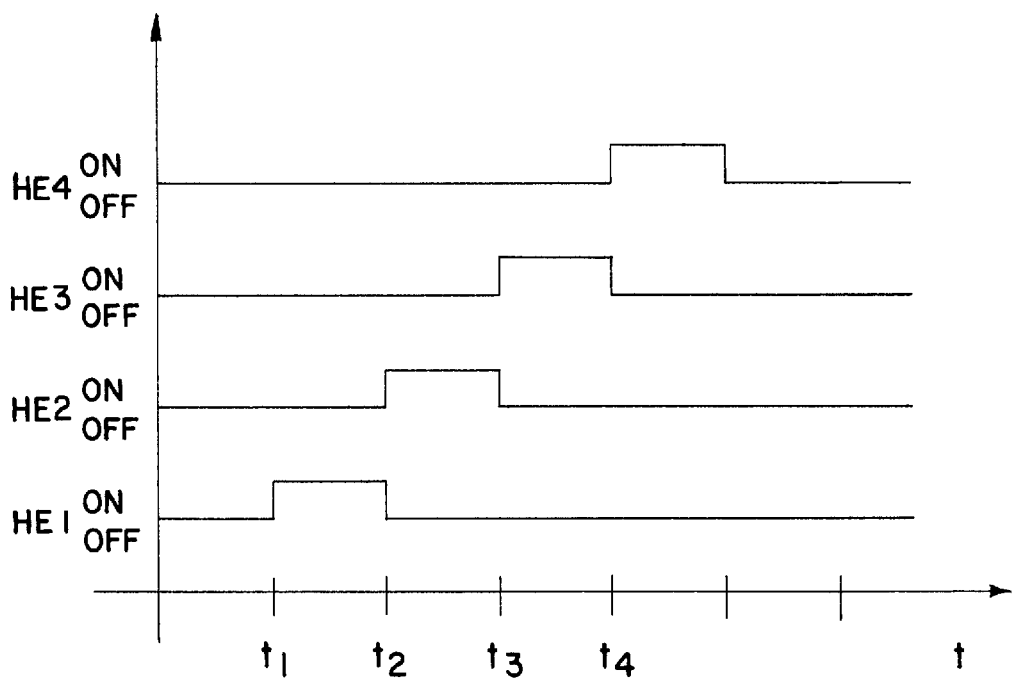
FIG. 3a is a graph of a timing sequence of control signals applied to the Hall elements according to a preferred embodiment of the present invention.

FIG. 3a is a graph of a timing sequence of control signals applied to the Hall elements according to a preferred embodiment of the present invention. At time $t_1$, Hall element HE1 is turned on and the remaining Hall elements HE2–HE8 are turned off by the control signals transmitted by the control unit ST. By turning off a majority of the Hall elements, the current requirement of the entire circuit arrangement, which is essentially defined by the current requirements of the Hall elements HE1 to HE18, is drastically reduced. In addition, the switches S1 to S18 are initially switched by the control unit ST so that the output signals D1 to D18 of the Hall elements HE1 to HE18 respectively are transmitted to their respective memory component groups SP1 to SP18. In this example it is assumed that the velocity of the position change does not exceed a threshold value. After a defined amount of time which is required for a stable output signal D1 from the Hall element HE1 to be present, the memory component group SP1 is triggered, preferably with a time delay $\Delta t$, or by a separate control line of the control unit ST, to store the output signal D1. Thereafter at a time $t_2$, Hall element HE1 is deactivated by the control unit ST and Hall element HE2 is activated. The memory component group SP2 assigned to Hall element HE2 is also activated after a time delay $\Delta t$ to store output signal D2 of the Hall element HE2 in the memory component group SP2. Hall element HE2 is then deactivated by the control unit ST at a time $t_3$ and Hall element HE3 is activated. This process is repeated until the output signal of each Hall element HE1–HE18 has been stored in their respectively assigned memory component group SP1–SP18. In a preferred embodiment the memory component groups SP1–SP 18 are advantageously designed as flip-flops which do not change the stored bit until a new activation thereby making it available as the output signal of the angle encoder in a parallel form.

Since an optical graduation OG (not shown), which has a considerably higher resolution, is additionally provided there is also the option that position determination with the aid of the Hall elements takes place only if an absolute position needs to be determined, for example, after the angle encoder is switched on, or that the Hall elements are only used for position determination at defined time intervals. During continuous operation, the number of revolutions of the optical graduation OG can also be counted by the control unit ST for the purpose of an absolute position determination.

Alternatively there is also the option that instead of activating only one Hall element at a time, several Hall elements are simultaneously activated. However, in this case it must be taken into consideration that more than a single data line DL is necessary between the Hall elements HE1 to HE18 and their respective memory component groups SP1 to SP18 and a separate data line must be provided for each combination of Hall elements and assigned memory component groups.

Figure 3B:
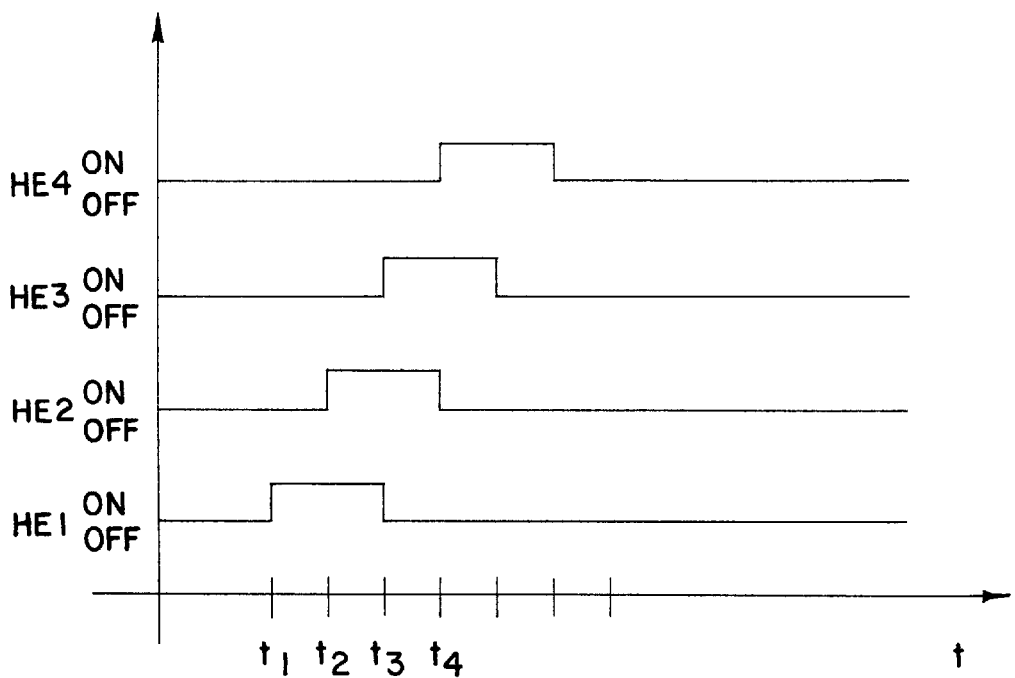
FIG. 3b is a graph of a timing sequence of control signals applied to the Hall elements according to another preferred embodiment of the present invention.
Figure 4:
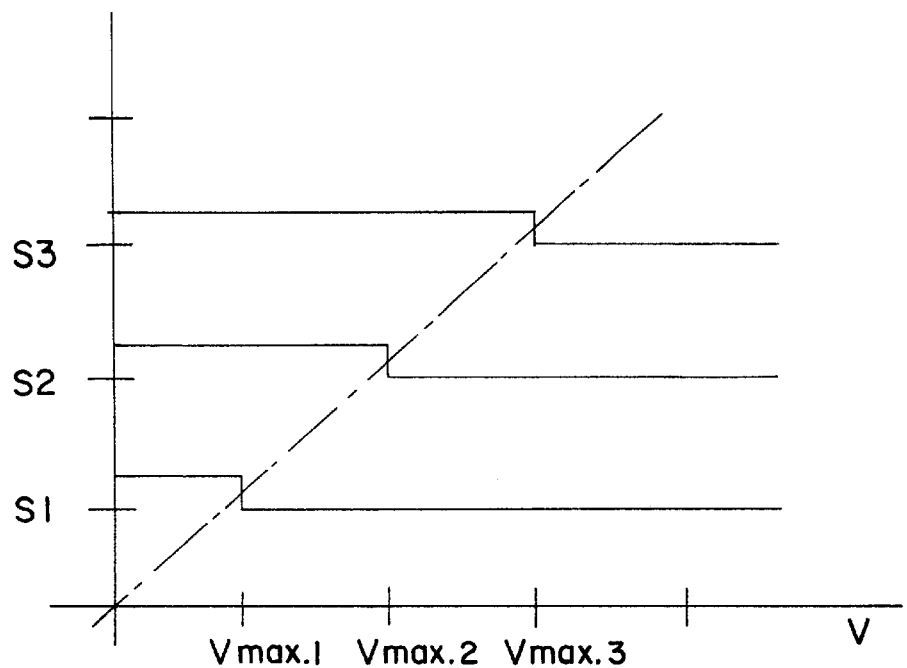
FIG. 4 is a graph of a sequence of velocity-dependent control signals for switching off individual Hall elements according to a preferred embodiment of the present invention.

FIG. 3b is a graph of a timing sequence of control signals applied to the Hall elements according to another preferred embodiment of the present invention. In this preferred embodiment, a subsequent Hall element is activated before the previous Hall element is deactivated. In this preferred embodiment the Hall elements and their assigned memory component groups are sequentially activated and there is no wait until the previously activated Hall element is deactivated so that a plurality of Hall elements together with their assigned memory component elements are activated with a time overlap. It is possible in this way to achieve an arbitrary compromise between processing speed and low current consumption depending on how many Hall elements are simultaneously activated. With this alternative, it is also necessary to provide a separate data line DL for any combination of Hall elements and memory component groups.

In another preferred embodiment of the present invention, a signal which quantifies the velocity V of the position change, an angular velocity in case of an angle encoder, is directed to the control unit ST. For example, this signal can be the output signal D1 of the first Hall element HE1 (see FIG. 1). The control unit ST then makes a comparison to determine whether the velocity V of the position change is greater than a first threshold value $V_{max.1}$. If so, a control signal is transmitted by the control unit ST to switch S1 which switches the switch S1 so that the memory component group SP1 is bypassed. In this case the output signal D1 of the Hall element HE1 is then directly output without any intermediate storage. It is then possible to issue a signal by the control unit ST to deactivate the memory component group SP1, which is now no longer needed. The first threshold value $V_{max.1}$ is selected in such a way that when it is exceeded, the velocity V of the position change is so great that an intermediate storage is no longer necessary because the output signal D1 is permanently present.

If the first threshold value $V_{max.1}$ was exceeded, a check is made whether a second threshold value $V_{max.2}$ has also been exceeded. If this is the case, the second switch S2 is also switched and the memory component group SP2 is bypassed. The output signal D2 of the Hall element HE2 is then also directly output without intermediate storage. A signal for deactivating the memory component group SP2, which is now no longer required, can also be output by the control unit ST. The second threshold value $V_{max.2}$ is selected, similar to the first threshold value $V_{max.1}$, in such a way that when it is exceeded, the velocity V of the position change is so great that an intermediate storage is no longer required because the output signal D2 is permanently present. As a rule, the second threshold value $V_{max.2}$ will be twice the first threshold value $V_{max.1}$ since the change in the magnetic field at the Hall element HE1 has twice the frequency of the change of the magnetic field at the Hall element HE2.

This process of switching the output signals of Hall elements can be performed for all Hall elements HE1 to HE18 which, based on the maximum r.p.m. provided for the angle encoder, permanently transmit an output signal and for which therefore no intermediate storage is required. In accordance with the above example, each further required threshold values $V_{max.3}$, $V_{max.4}$, etc. are selected to be twice as large as the preceding threshold value.

Immediately upon a threshold value falling below one of the threshold values for the velocity of the position change, the switch associated with the respective threshold value is switched back and the assigned memory component group is activated again to store the output signal. Immediately when the velocity of the position charge falls below one of the threshold values, the switch associated with the respective threshold valve is switched back and the assigned memory component group is activated again to store the output signal. This means that the velocity of the position change is permanently compared with the threshold values by the control unit ST. If it is detected that the velocity V is smaller than a threshold value, then the switch associated with the respective threshold value is switched back so that the respective memory is activated again to store the output signal of the respective Hall element.

Figure 5:
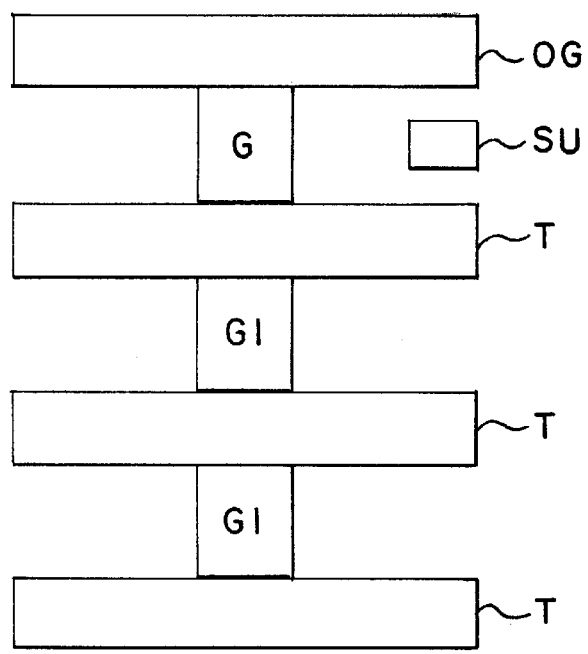
FIG. 5 schematically shows an embodiment of a position sensor according to the present invention.

In another preferred embodiment a plurality of magnetic graduations T of FIG. 2 is provided by which it is possible to expand the resolution and/or the weight range of the angle encoder for each additional graduation track by a factor of 2. In this case as shown in FIG. 5 the rotary movement is reduced corresponding to the number of graduation tracks by a gear (not shown) or, with a corresponding arrangement of the graduations, increased, if necessary. As already described in connection with the coupling between an optical and a magnetic graduation T, it is necessary for each graduation track to transfer the r.p.m., reduced by a factor of 2, to the next graduation T by a digital code. The transmission ratio for the gear GG1 for further graduations is $2^{number\ of\ graduation\ tracks}$. Thus if a first graduation T has 6 graduation tracks, a second graduation T has 4 graduation tracks and a third graduation T has 5 graduation tracks, then the transmission ratio from the first graduation T to the second has to be $2^6:1$ so that the second graduation rotates one revolution for every six revolutions of the first graduation T. From the second graduation T to the third the transmission ratio is $2^4:1$. Thus, if four graduation tracks TS1 to TS4 are provided on a first graduation T, for a second graduation T it is necessary to reduce the rotating movement of this first graduation T by the factor $2^4$.

How often the individual Hall elements HE1 to HE18 are activated is selected as a function of the frequency of their output signals. Since the output signal of the Hall element HE1 has the largest frequency, it is activated the most and therefore occurs the most in the sequence of the Hall elements which are essentially sequentially activated by the control unit ST. The output signal of the Hall element HE2 has half the frequency of the output signal of the Hall element HE1 and therefore occurs in the sequence only half as often as the Hall element HE1. This correspondingly applies to the further Hall elements. With the additional requirement that two activations of the same Hall element HE1 to HE18 should possibly always have the same distance in time from each other, the sequence in which the control unit ST activates the individual Hall elements HE1 to HE18 is unequivocally defined.

It is to be understood that the forms of the invention described herewith are to be taken as preferred examples and that various changes in the shape, size and arrangement of parts may be resorted to, without department from the spirit of the invention or scope of the claims.

What is claimed is:

1. A method for the operation of a position sensor comprising a plurality of Hall elements that scan a graduation and a plurality of memories wherein each of the plurality of Hall element has a memory assigned from the plurality of memories, the method comprising:

activating the plurality of Hall elements in a predetermined sequence by a control unit;

deactivating the plurality of Hall elements in a predetermined sequence by the control unit wherein at least one of the plurality of Hall elements is activated by the control unit while a majority of the remaining ones of the plurality of Hall elements are deactivated by the control unit; and activating the memory assigned to the at least one activated Hall element for storing an output signal of the at least one activated Hall element.

2. The method according to claim 1 wherein the activating the plurality of Hall elements in a predetermined sequence comprises the control unit activating a subsequent Hall element immediately after a previously activated Hall element is deactivated by the control unit.

3. A method for the operation of a position sensor comprising a plurality of Hall elements that scan a graduation and a plurality of memories wherein each of the plurality of Hall element has a memory assigned from the plurality of memories, the method comprising:

activating the plurality of Hall elements in a predetermined sequence;

deactivating the plurality of Hall elements in a predetermined sequence wherein at least one of the plurality of Hall elements is activated while a majority of the remaining ones of the plurality of Hall elements are deactivated; and activating the memory assigned to the at least one activated Hall element for storing an output signal of the at least one activated Hall element, where in the deactivated state no electrical current is drawn by a Hall element or its associated memory.

4. The method according to claim 1 further comprising:

activating all of the plurality of Hall elements when the position sensor is coupled to a supply voltage; and transmitting an absolute position.

5. A method for the operation of a position sensor comprising a plurality of Hall elements that scan a graduation and a plurality of memories wherein each of the plurality of Hall element has a memory assigned from the plurality of memories, the method comprising:

activating the plurality of Hall elements in a predetermined sequence, deactivating the plurality of Hall elements in a predetermined sequence wherein at least one of the plurality of Hall elements is activated while a majority of the remaining ones of the plurality of Hall elements are deactivated;

activating the memory assigned to the at least one activated Hall element for storing an output signal of the at least one activated Hall element; and wherein the activating the plurality of Hall elements in a predetermined sequence is determined as a function of the frequency of output signals of the plurality of Hall elements.

6. A method for the operation of a position sensor comprising a plurality of Hall elements that scan a graduation and a plurality of memories wherein each of the plurality of Hall element has a memory assigned from the plurality of memories, the method comprising:

activating the plurality of Hall elements in a predetermined sequence;

deactivating the plurality of Hall elements in a predetermined sequence wherein at least one of the plurality of Hall elements is activated while a majority of the remaining ones of the plurality of Hall elements are deactivated;

activating the memory assigned to the at least one activated Hall element for storing an output signal of the at least one activated Hall element; and wherein the activating the memory assigned to the at least one activated Hall element occurs at a time delayed from the activating the Hall element assigned to the activated memory.

7. The method according to claim 6 wherein the deactivating the plurality of Hall elements occurs at a constant time delay with respect to the activating the plurality of Hall elements.

8. The method according to claim 7, wherein the time delay between activating the memory assigned to the at least one activated Hall element and activating the Hall element assigned to the activated memory is less than the constant time delay.

9. A method for the operation of a position sensor comprising a plurality of Hall elements that scan a graduation and a plurality of memories wherein each of the plurality of Hall element has a memory assigned from the plurality of memories, the method comprising:

activating the plurality of Hall elements in a predetermined sequence;

deactivating the plurality of Hall elements in a predetermined sequence wherein at least one of the plurality of Hall elements is activated while a majority of the remaining ones of the plurality of Hall elements are deactivated;

activating the memory assigned to the at least one activated Hall element for storing an output signal of the at least one activated Hall element; and wherein the activating the plurality of Hall elements in a predetermined sequence and deactivating the plurality of Hall elements comprises activating a Hall element before deactivating at least one Hall element.

10. A method for the operation of a position sensor comprising a plurality of Hall elements that scan a graduation and a plurality of memories wherein each of the plurality of Hall element has a memory assigned from the plurality of memories, the method comprising:

activating the plurality of Hall elements in a predetermined sequence;

deactivating the plurality of Hall elements in a predetermined sequence wherein at least one of the plurality of Hall elements is activated while a majority of the remaining ones of the plurality of Hall elements are deactivated;

activating the memory assigned to the at least one activated Hall element for storing an output signal of the at least one activated Hall element;

comparing a threshold for a frequency of output signals of one or several Hall elements to an actual frequency of output signals of the one or several Hall elements; and deactivating each of the memories assigned to the plurality of Hall elements whose actual frequency exceed the threshold frequency assigned to each of the plurality Hall elements.

11. A method for the operation of a position sensor comprising a plurality of Hall elements that scan a graduation, the method comprising:

activating the plurality of Hall elements in a predetermined sequence by a control unit so as to scan the graduation; and deactivating the plurality of Hall elements in a predetermined sequence by the control unit wherein at least one of the plurality of Hall elements is activated by the control unit while a majority of the remaining ones of the plurality of Hall elements are deactivated by the control unit.

12. A position sensor comprising:

a plurality of Hall elements;

a control unit for the selective activation and deactivation of the plurality of Hall elements, wherein each of the plurality of Hall elements is coupled to the control unit by a first control line; and a plurality of memories, wherein each one of said plurality of memories is assigned to different ones of the plurality of Hall elements wherein each of the plurality of memories and their assigned one of the plurality of Hall elements are coupled by a data line and the memory is coupled to the control unit by a second control line.

13. The position sensor according to claim 12, wherein the position sensor comprises an absolute value sensor.

14. The position sensor according to claim 12, wherein the position sensor comprises a magnetic graduation, and an optical graduation.

15. The position sensor according to claim 14, wherein the position sensor comprises an angle encoder and comprises a gear which reduces the rotary movement of the optical graduation with respect to the magnetic graduation.

16. The position sensor according to claim 15, wherein the gear reduces the rotary movement of the optical graduation in stages down to several magnetic graduations with respect to several graduation tracks, respectively.

17. A position sensor comprising:

a plurality of Hall elements;

a control unit for the selective activation and deactivation of the plurality of Hall elements, wherein each of the plurality of Hall elements is coupled to the control unit by a first control line;

a plurality of memories, wherein each one of said plurality of memories is assigned to different ones of the plurality of Hall elements wherein each of the plurality of memories and their assigned one of the plurality of Hall elements are coupled by a data line and the memory is coupled to the control unit by a second control line; and wherein the control unit is programmed to activate individual Hall elements in a sequence determined as a function of the frequency of output signals of the individual Hall elements.

18. A position sensor comprising:

a plurality of Hall elements;

a control unit for the selective activation and deactivation of the plurality of Hall elements, wherein each of the plurality of Hall elements is coupled to the control unit by a first control line;

a plurality of memories, wherein each one of said plurality of memories is assigned to different ones of the plurality of Hall elements wherein each of the plurality of memories and their assigned one of the plurality of Hall elements are coupled by a data line and the memory is coupled to the control unit by a second control line; and wherein a single data line couples each of the plurality of Hall elements with the their assigned one of the plurality of memories.

19. A position sensor comprising:

a plurality of Hall elements;

a control unit for the selective activation and deactivation of the plurality of Hall elements, wherein each of the plurality of Hall elements is coupled to the control unit by a first control line;

a plurality of memories, wherein each one of said plurality of memories is assigned to different ones of the plurality of Hall elements wherein each of the plurality of memories and their assigned one of the plurality of Hall elements are coupled by a data line and the memory is coupled to the control unit by a second control line; and wherein the control unit determines a velocity of a graduation change based on a frequency of one of the output signals of the Hall elements.

20. The position sensor according to claim 19 further comprises a plurality of switches coupling the plurality of Hall elements to the memory wherein the plurality of switches has a first position which transmit outputs of the plurality of Hall elements to the memory and the switch has a second position which bypasses the memory wherein the control unit detects when a threshold value of the velocity of the graduation is exceeded and, if so, transmits a control signal to at least one of the switches to place it in its second position.

21. A position sensor comprising:

a plurality of Hall elements;

a control unit for the selective activation and deactivation of the plurality of Hall elements, wherein each of the plurality of Hall elements is coupled to the control unit by a first control line;

a plurality of memories, wherein each one of said plurality of memories is assigned to different ones of the plurality of Hall elements wherein each of the plurality of memories and their assigned one of the plurality of Hall elements are coupled by a data line and the memory is coupled to the control unit by a second control line; and wherein the control signal line coupling the control unit with each of the plurality of Hall elements is also coupled to the memory through a time delay unit.

22. A position sensor comprising:

a plurality of Hall elements;

a control unit for the selective activation and deactivation of one or more of the plurality of Hall elements, wherein each of the plurality of Hall elements is coupled to the control unit;

a plurality of memories, wherein each one of said plurality of memories is assigned to different ones of the plurality of Hall elements wherein each of the plurality of memories and their assigned one of the plurality of Hall elements are coupled by a data line;

a switch assigned to the corresponding one of the plurality of Hall elements and the switch comprises a first position which allows an output transmission from the corresponding Hall element to the corresponding memory and comprises a second position which allows output transmission from the corresponding Hall element to the control unit while bypassing the corresponding memory.

23. A position sensor comprising:
- a first Hall element that has a first output signal frequency based on a first magnetic field;
- a second Hall element that has a second output signal frequency based on a second magnetic field that is less than the first output signal frequency of the first Hall element;
- a control unit that is coupled to said first Hall element and said second Hall element by a control line, wherein said control unit selectively activates and deactivates the first and second Hall elements and activates the first Hall element more frequently than the second Hall element.

24. The position sensor according to claim 23, wherein the magnetic field of the first Hall element results from a first graduation track and the magnetic field at the second Hall element results from a second graduation track.

25. The position sensor according to claim 23, wherein the first Hall element generates an output signal that has two states and the frequency of activation of the first Hall element is dependent on the frequency of change between the two states.

26. The position sensor according to claim 23, wherein the second Hall element generates an output signal that has two states and the frequency of activation of the second Hall element is dependent on the frequency of change between the two states.

27. The position sensor according to claim 25, wherein the second Hall element generates a second output signal that has two states and the frequency of activation of the second Hall element is dependent on the frequency of change between the two states of the second output signal.

28. A method for the operation of a position sensor comprising a first Hall element and a second Hall element, the method comprising:
- activating and deactivating the first Hall element;
- activating and deactivating the second Hall element less frequently than activating and deactivating the first Hall element;
- wherein the first order time derivative of the change in a magnetic field at the first Hall element is higher than the first order time derivative of the change in a magnetic field at the second Hall element.

* * * * *

UNITED STATES PATENT AND TRADEMARK OFFICE
CERTIFICATE OF CORRECTION

PATENT NO.    : 6,320,373 B1
DATED         : November 20, 2001
INVENTOR(S)   : Erich Strasser It is certified that error appears in the above-identified patent and that said Letters Patent is hereby corrected as shown below:

Column 7,
Line 7, delete "element" and substitute -- elements -- in its place.
Line 28, delete "element" and substitute -- elements -- in its place.

Column 10,
Line 4, delete "the their" and substitute -- their -- in its place.

Signed and Sealed this

Twenty-second Day of October, 2002

Attest:

JAMES E. ROGAN
Attesting Officer           Director of the United States Patent and Trademark Office